(12) United States Patent
Effenberger

(10) Patent No.: US 9,032,209 B2
(45) Date of Patent: May 12, 2015

(54) OPTICAL NETWORK TERMINAL MANAGEMENT CONTROL INTERFACE-BASED PASSIVE OPTICAL NETWORK SECURITY ENHANCEMENT

(71) Applicant: Futurewei Technologies, Inc., Plano, TX (US)

(72) Inventor: Frank Effenberger, Colts Neck, NJ (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/063,922

(22) Filed: Oct. 25, 2013

(65) Prior Publication Data

US 2014/0052991 A1 Feb. 20, 2014

Related U.S. Application Data

(63) Continuation of application No. 12/844,173, filed on Jul. 27, 2010, now Pat. No. 8,850,197.

(60) Provisional application No. 61/230,520, filed on Jul. 31, 2009.

(51) Int. Cl.
*H04L 29/06* (2006.01)
*H04L 9/32* (2006.01)
(Continued)

(52) U.S. Cl.
CPC ........ *H04L 63/20* (2013.01); *G06F 2221/2103* (2013.01); *G06F 2221/2107* (2013.01);
(Continued)

(58) Field of Classification Search
CPC .................................................. H04L 63/20

USPC .................................. 713/171, 170; 726/1, 3
See application file for complete search history.

(56) References Cited

U.S. PATENT DOCUMENTS 8,254,780 B2* 8/2012 Mizutani et al. ................. 398/24
2002/0196801 A1* 12/2002 Haran et al. ................... 370/432
(Continued)

FOREIGN PATENT DOCUMENTS

CN 1968089 A 5/2007
CN 101064719 A 10/2007
(Continued)

OTHER PUBLICATIONS

"EPON Powersaving via Sleep Mode"—Jeff Mandin, PMC-Sierra, Sep. 2008.*
(Continued)

*Primary Examiner* — Randy Scott
(74) *Attorney, Agent, or Firm* — Conley Rose, P.C.; Grant Rodolph; Jonathan K. Polk

(57) ABSTRACT

A network component comprising at least one processor coupled to a memory and configured to exchange security information using a plurality of attributes in a management entity (ME) in an optical network unit (ONU) via an ONU management control interface (OMCI) channel, wherein the attributes provide security features for the ONU and an optical line terminal (OLT). Also included is an apparatus comprising an ONU configured to couple to an OLT and comprising an OMCI ME, wherein the OMCI ME comprises a plurality of attributes that support a plurality of security features for transmissions between the ONU and the OLT, and wherein the attributes are communicated via an OMCI channel between the ONU and the OLT and provide the security features for the ONU and the OLT.

14 Claims, 5 Drawing Sheets

(51) Int. Cl.
*H04Q 11/00* (2006.01)
*H04L 9/08* (2006.01)

(52) U.S. Cl.
CPC .......... *H04L9/3271* (2013.01); *H04L 63/0869* (2013.01); *H04L 63/162* (2013.01); *H04Q 11/0067* (2013.01); *H04Q 2011/0079* (2013.01); *H04Q 2011/0088* (2013.01); *H04L 9/0822* (2013.01)

(56) References Cited

U.S. PATENT DOCUMENTS

| | | | |
|---|---|---|---|
| 2005/0047602 | A1 | 3/2005 | Lee et al. |
| 2006/0098593 | A1 | 5/2006 | Edvardsen et al. |
| 2006/0129814 | A1* | 6/2006 | Eun et al. ................ 713/168 |
| 2006/0228113 | A1* | 10/2006 | Cutillo et al. .............. 398/71 |
| 2007/0133800 | A1 | 6/2007 | Kim et al. |
| 2007/0274720 | A1 | 11/2007 | Menasco, Jr. et al. |
| 2008/0037986 | A1 | 2/2008 | Effenberger |
| 2008/0040604 | A1 | 2/2008 | Kim et al. |
| 2008/0273878 | A1 | 11/2008 | Wu et al. |
| 2009/0049532 | A1* | 2/2009 | Gao et al. ..................... 726/5 |
| 2009/0262643 | A1 | 10/2009 | Zhao et al. |
| 2009/0300160 | A1 | 12/2009 | Wan et al. |
| 2010/0067901 | A1* | 3/2010 | Mizutani et al. ............ 398/20 |
| 2010/0272259 | A1 | 10/2010 | Kim et al. |
| 2011/0214160 | A1* | 9/2011 | Costa et al. ................... 726/3 |

FOREIGN PATENT DOCUMENTS

| | | |
|---|---|---|
| CN | 101247220 A | 8/2008 |
| CN | 101252500 A | 8/2008 |
| CN | 101252522 A | 8/2008 |
| CN | 101361399 A | 2/2009 |
| EP | 2106064 A1 | 9/2009 |
| JP | 2010199673 A | 9/2010 |
| RU | 2325771 C2 | 5/2008 |
| WO | 2007124658 A1 | 11/2007 |
| WO | 2011012092 A1 | 2/2011 |

OTHER PUBLICATIONS

Notice of Allowance dated Jan. 9, 2013, 5 pages, U.S. Appl. No. 13/296,158, filed Nov. 14, 2011.
Notice of Allowance dated Sep. 18, 2012, 7 pages, U.S. Appl. No. 13/296,158, filed Nov. 14, 2011.
Foreign Communication From a Counterpart Application, Russian Application No. 2012107414, Russian Office Action dated Jul. 24, 2013 13 pages.
Foreign Communication From a Counterpart Application, Russian Application No. 2012107414, English Translation of Russian Office Action dated Jul. 24, 2013, 9 pages.
Foreign Communication From a Counterpart Application, PCT Application No. PCT/CN2010/075618, Partial Translation of Chinese Published Application CN101064719A, 14 pages.
Foreign Communication From a Counterpart Application, Chinese Application No. 201080028318.0, Chinese Office Action dated Dec. 4, 2013, 11 pages.
Foreign Communications From a Counterpart Application, Chinese Application No. 201080028318.0, Chinese Search Report dated Nov. 25, 2013, 2 pages.
Foreign Communication From a Counterpart Application, Russian Application No: 2012107414, Russian Notice of Allowance dated Jan. 10, 2013, 13 pages.
Foreign Communication From a Counterpart Application, Russian Application No: 2012107414, English Translation of Russian Notice of Allowance dated Jan. 10, 2013, 9 pages.
Foreign Communication From a Counterpart Application, Partial Translation of Chinese Published Application CN101064719A, 14 pages.
Mandin, J., "EPON Powersaving via Sleep Mode," PMC Sierra, Sep. 2008, 8 pages.

"Framework for TR-069 enabled Pon Devices," TR-142, Broadband Forum, Issue No. 1.0, Mar. 2008, 13 pages.
"Secure Hash Standard (SHS)," Federal Information Processing Standards, FIPS PUB 180-3, Computer Security, Oct. 2008, 32 pages.
"ONU Management and Control Interface (OMCI) Specification," Draft Recommendation ITU-T G.988, Jun. 2010, 555 pages.
"Draft Standard for Information Technology, Telecommunications and Information Exchange Between Systems, Local and Metropolitan Area Networks, Specific Requirements, Part 3: Carrier Sense Multiple Access with Collision Detection (CSMA/CD) Access Method and Physical Layer Specifications," IEEE P802.3av, D2.2, Dec. 3, 2008, 267 pages.
"Series G: Transmission Systems and Media, Digital Systems and Networks, Digital Sections and Digital Line System for Local and Access Networks, ONT Management and Control Interface Specification for B-PON," ITU-T, Telecommunication Standardization Sector of ITU, G.983.2, Jul. 2005, 370 pages.
"Series G: Transmission Systems and Media, Digital Systems and Networks, Digital Sections and Digital Line System-Optical Line Systems for Local and Access Networks, Gigabit-Capable Passive Optical Networks (G-PON): Transmission Convergence Layer Specification," ITUT G. 984.3, Mar. 2008, 146 pages.
"Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," ITUT G. 984.4, Feb. 2008, 430 pages.
"Gigabit-Capable Passive Optical Networks (GPON): ONT Management and Control Interface Specification," Draft Recommendation ITU-T, G.984.4, Amendment 2, 2008, 150 pages.
"Series G: Transmission Systems and Media Digital Systems and Networks, Digital Sections and Digital Line System-Optical Systems for Local and Access Networks, Gigabit-Capable Passive Optical Networks (G-PON): ONT Management and Control Interface Specification, Amendment 2: Changes and Extensions to the OMCI, Editorial Clarifications and Corrections," ITU-T G. 984.4 Amendment 2, Nov. 2009, 164 pages.
"Series G: Transmission Systems and Media, Digital Systems and Networks, Digital Sections and Digital Line System-Optical Line Systems for Local and Access Networks, Gigabit-Capable Passive Optical Networks (G-PON): Physical Media Dependent (PMD) Layer Specification," G. 984.2, Telecommunication Standardization Sector of ITU, Mar. 2003, 38 pages.
"Series G: Transmission Systems and Media, Digital Systems and Networks, Digital Sections and Digital Line System-Optical Line Systems for Local and Access Networks, Gigabit-Capable Passive Optical Networks (G-PON): Physical Media Dependent (PMD) Layer Specification," G. 984.2 Amendment 1, Telecommunication Standardization Sector of ITU, Feb. 2006, 12 pages.
"Series G: Transmission Systems and Media, Digital Systems and Networks, Digital Sections and Digital Line System-Optical Line Systems for Local and Access Networks, Gigabit-Capable Passive Optical Networks (G-PON): Physical Media Dependent (PMD) Layer Specification," G. 984.2 Amendment 2, Telecommunication Standardization Sector of ITU, Mar. 2008, 16 pages.
"Series G: Transmission Systems and Media, Digital Systems and Networks, Digital Sections and Digital Line System-Optical Line Systems for Local and Access Networks, Gigabit-Capable Passive Optical Networks (G-PON): Transmission Convergence Layer Specification," G. 984.3 Erratum, Telecommunication Standardization Sector of ITU, Apr. 28, 2010, 1 page.
"Series G: Transmission Systems and Media, Digital Systems and Networks, Digital Sections and Digital Line System-Optical Line Systems for Local and Access Networks, Gigabit-Capable Passive Optical Networks (G-PON):Transmission Convergence Layer Specification,"G. 984.3 Amendment 1, Telecommunication Standardization Sector of ITU, Feb. 2009, 16 pages.
"Series G: Transmission Systems and Media, Digital Systems and Networks, Digital Sections and Digital Line System-Optical Line Systems for Local and Access Networks, Gigabit-Capable Passive Optical Networks (G-PON): Transmission Convergence Layer Specification," ITUT G. 984.3 Amendment 2, Nov. 2009, 18 pages.

(56) References Cited

OTHER PUBLICATIONS

"Series G: Transmission Systems and Media, Digital Systems and Networks, Digital Sections and Digital Line System-Optical Line Systems for Local and Access Networks, Gigabit-Capable Passive Optical Networks (G-PON): Transmission Convergence Layer Specification," G. 984.3 Amendment 3, Telecommunication Standardization Sector of ITU, Apr. 2012, 18 pages.

"Series G: Transmission Systems and Media, Digital Systems and Networks, Digital Sections and Digital Line System—Optical Line Systems for Local and Access Networks," Gigabit-Capable Passive Optical Networks (G-PON): Transmission Convergence Layer Specification, ITU-T, Telecommunication Standardization Sector of ITU, G.984.3, Feb. 2004, 116 pages.

"Series G: Transmission Systems and Media, Digital Systems and Networks, Digital Sections and Digital Line System—Optical Line Systems for Local and Access Networks, Gigabit-Capable Passive Optical Networks (G-PON): ONT Management and Control Interface Specification," G. 984A Erratum, Telecommunication Standardization Sector of ITU, Aug. 12, 2009, 2 pages.

"Series G: Transmission Systems and Media, Digital Systems and Networks, Digital Sections and Digital Line System—Optical Line Systems for Local and Access Networks, Gigabit-Capable Passive Optical Networks (G-PON): ONT Management and Control Interface Specification," G. 984A Corrigendum 1, Telecommunication Standardization Sector of ITU, Mar. 2010, 8 pages.

"Series G: Transmission Systems and Media, Digital Systems and Networks, Digital Sections and Digital Line System—Optical Line Systems for Local and Access Networks, Gigabit-Capable Passive Optical Networks (G-PON): ONT Management and Control Interface Specification," G. 984.4 Amendment 1, Telecommunication Standardization Sector of ITU, Jun. 2009, 92 pages.

"Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," G. 984.4 Amendment 3, Telecommunication Standardization Sector of ITU, Jul. 2010, 10 pages.

"Series G: Transmission Systems and Media, Digital Systems and Networks, Digital Section and Digital Line System—Optical Line Systems for Local and Access Networks, 10-Gigabit-Capable Passive Optical Networks (CG-PON): Transmission Convergence (TC) Specifications," ITU-T, Telecommunication Standardization Sector of ITU, G.987.3, Oct. 2010, 146 pages.

"Series G: Transmission Systems and Media Digital Systems and Networks, Digital Sections and Digital Line System—Optical Line Systems for Local and Access Networks, 10-Gigabit-Capable Passive Optical Network (XG-PON) Systems: Definitions, Abbreviations and Acronyms," ITU-T, Telecommunication Standardization Sector of ITU, G.987, Oct. 2010, 26 pages.

Solina, P., et al., "Proposal to Improve Current G-PON ITU-T G.984.3 Security Mechanisms," Telecommunication Standardization Sector, Study Group 15, Telecom Italia S.p.A, Contribution Question 2/15, Geneva, Sep. 2009, 16 pages.

"Proposed to Improve Current G-PON ITUT G. 984.3 Security Mechanisms," Study Group 15 Contribution Question 2/15, Telecom Italia S.p.A, May 2009, 13 pages.

Hood, et al., "Security Features in G.988," Study Group 15, Question 2, ITU-T G. 987.3 Draft XG-PON TC Layer Specification, Geneva, Switzerland, May 31-Jun. 11, 2010, 8 pages.

"IEEE Standard for Local and Metropolitan Area Networks, Virtual Bridged Local Area Networks, Amendment 7: Provider Backbone Bridges," 802.1 ah, Aug. 14, 2008, 121 pages.

Foreign Communication From a Related Counterpart Application, PCT Application No. PCT/CN2010/075618, International Search Report dated Dec. 2, 2010, 4 pages.

Foreign Communication From a Related Counterpart Application, PCT Application No. PCT/CN2010/075618, Written Opinion dated Dec. 2, 2010, 8 pages.

Foreign Communication From a Related Counterpart Application, European Application 10803925.6, Extended European Search Report dated Aug. 6, 2012, 11 pages.

Foreign Communication From a Counterpart Application, Mexican Patent Application No. MX/a/2012/001203, Mexican Office Action dated Apr. 1, 2013, 2 pages.

Foreign Communication From a Counterpart Application, Mexican Patent Application No. MX/a/2012/001203, English Translation of Mexican Office Action dated Apr. 1, 2013, 3 pages.

Foreign Communication From a Counterpart Application, Russian Application 2012107414, Russian Office Action dated May 21, 2013, 5 pages.

Foreign Communication From a Counterpart Application, Russian Application 2012107414, English Translation of Russian Office Action dated May 21, 2013, 4 pages.

Foreign Communication From a Counterpart Application, Australian Application No. 2010278478, Australian Office Action dated Jul. 11, 2013, 4 pages.

Foreign Communication From a Counterpart Application, European Application No. 10803925.6, European Office Action dated Sep. 10, 2013, 4 pages.

Office Action dated Mar. 21, 2012, 17 pages, U.S. Appl. No. 13/296,158, filed Nov. 14, 2011.

\* cited by examiner

OPTICAL NETWORK TERMINAL MANAGEMENT CONTROL INTERFACE-BASED PASSIVE OPTICAL NETWORK SECURITY ENHANCEMENT

CROSS-REFERENCE TO RELATED APPLICATIONS

This application is a continuation of U.S. patent application Ser. No. 12/844,173 filed Jul. 27, 2010 by Frank J. Effenberger and titled "Optical Network Terminal Management Control Interface-Based Passive Optical Network Security Enhancement," which claims priority to U.S. Provisional Patent Application No. 61/230,520 filed Jul. 31, 2009 by Frank J. Effenberger and titled "Optical Network Terminal Management Control Interface-Based Gigabit-Passive Optical Network Security Enhancement," which are incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. Downstream data transmissions are broadcast to all of the ONUs, while upstream data transmissions are transmitted to the OLT using time division multiple access (TDMA) or wave division multiple access (WDMA). PON systems, such as Gigabit PONs (GPONs), may support some security features to protect user data, e.g. for the downstream broadcast. For example, the broadcast transmissions from the OLT to the ONU may be encrypted.

SUMMARY

In one embodiment, the disclosure includes a network component comprising at least one processor coupled to a memory and configured to exchange security information using a plurality of attributes in a management entity (ME) in an ONU via an ONU management control interface (OMCI) channel, wherein the attributes provide security features for the ONU and an OLT.

In another embodiment, the disclosure includes an apparatus comprising an ONU configured to couple to an OLT and comprising an OMCI ME, wherein the OMCI ME comprises a plurality of attributes that support a plurality of security features for transmissions between the ONU and the OLT, and wherein the attributes are communicated via an OMCI channel between the ONU and the OLT and provide the security features for the ONU and the OLT.

In yet another embodiment, the disclosure includes a method comprising exchanging a plurality of security attributes with an ONU using an OMCI channel, thereby providing a plurality of security features for communications from the ONU, wherein the attributes are exchanged without modifying a physical layer operation, administration, and management (PLOAM) channel between an OLT and the ONU.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
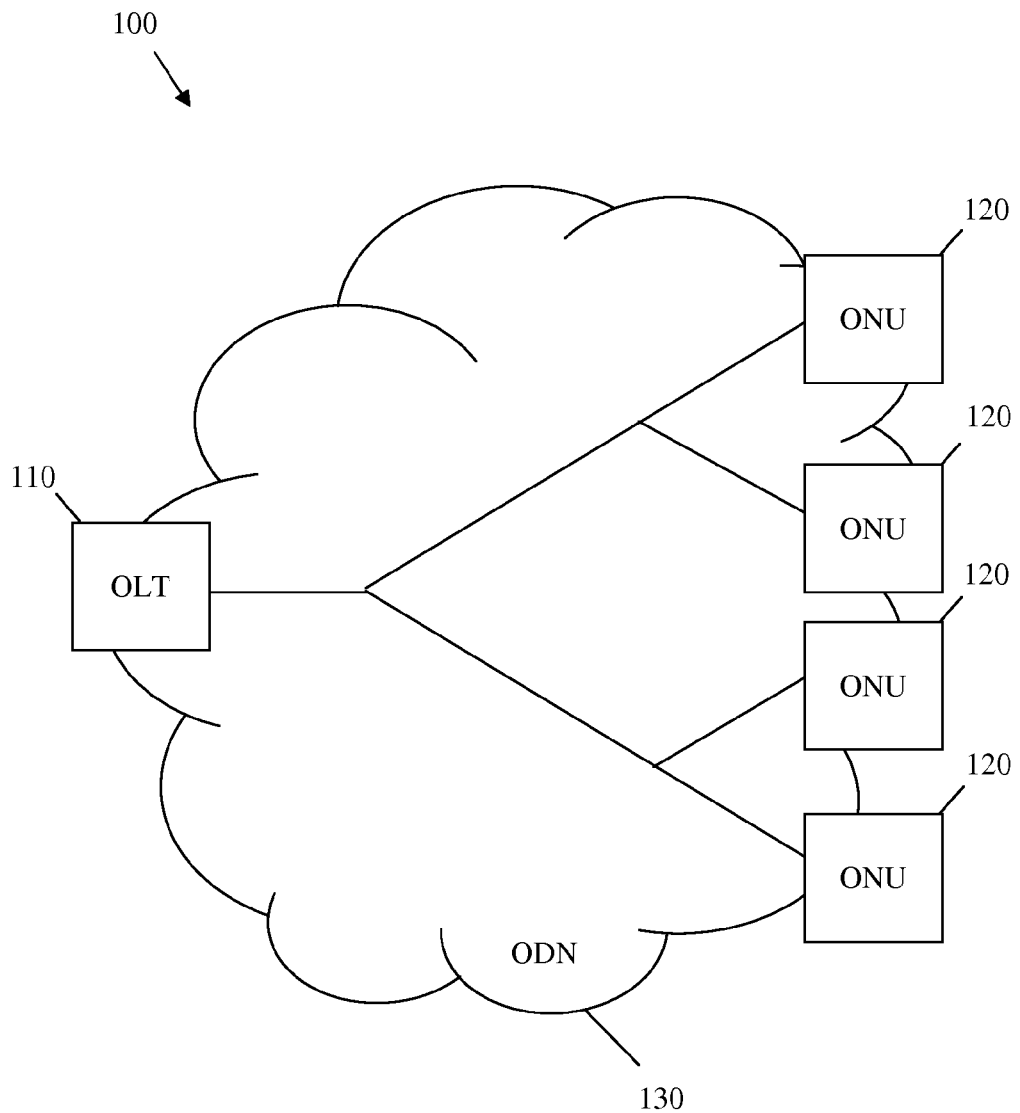
FIG. 1 is a schematic diagram of an embodiment of a PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In PON systems, downstream broadcast transmissions from the OLT to the ONU may be susceptible to security threats, such as an 'eavesdropping threat' that may be attempted by a user with malicious intent. For example, an unsubscribed user may attempt to receive unauthorized channels and/or timeslots from the OLT. To overcome such security threats, downstream broadcasts are typically encrypted. Upstream transmissions may also be encrypted. However, upstream transmissions may be more secure than downstream broadcast transmissions since legitimate or authorized ONUs cannot receive upstream transmissions from other ONUs due to the physical architecture of the PON and the directional nature of optical signals. Therefore, privileged information is typically transmitted upstream from the ONUs in clear text format, e.g. without encryption. However, enhanced attack methods, such as tapping optical transmission cables, may still present security concerns in PON systems. Thus, security improvements for downstream and/or upstream transmissions in PON systems may be desired, e.g. to protect encryption keys and/or other password information.

Means for providing some security improvements have been proposed previously, but typically require modifying the PLOAM channel. Since PLOAM processing commonly takes place at the physical layer, modifying the PLOAM channel may involve upgrading hardware in a plurality of network components, e.g. at the ONU and/or the OLTs. The PLOAM channel may not be modified easily via software and may require remote field installations to update hardware in the system's components. Consequently, the previously proposed security improvements based on modifying the PLOAM channel may not be practical or cost effective.

Disclosed herein is a method and system for providing improved security in PON systems. The security may be improved by exchanging security parameters and data using an OMCI channel, which may be used to provide a plurality of security features. The provided security features may comprise security capability discovery, ONU authentication, OLT authentication, key privacy, or combinations thereof. The security features may be supported by communicating a plurality of corresponding attributes in the OMCI channel. The attributes may be added to the OMCI channel using an OMCI ME. The security features may be provided by the OMCI via software implementations, and thus may be extensible or upgraded without substantial difficulty to accommodate system changes. As such, the security features may be provided without substantial changes or modifications to the PLOAM channel.

FIG. 1 illustrates one embodiment of a PON 100. The PON 100 may comprise an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be a next generation access (NGA) system, such as a ten Gigabit per second (Gbps) GPON (or XGPON), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the International Telecommunication Union Telecommunications Standardization Sector (ITU-T) G.983 standard, the GPON defined by the ITU-T G.984 standard, the Ethernet PON (EPON) defined by the Institute of Electrical and Electronics Engineers (IEEE) 802.3ah standard, the 10G-EPON defined by the IEEE 802.3av standard, and the Wavelength Division Multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. Typically, the ONUs may be located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the ONUs 120 and/or the OLT 110 may communicate using an OMCI, for instance to exchange control information in the PON 100. As such, the OLT may establish an OMCI channel to control some of the activities and/or operations of the ONUs 120. The OMCI may be used to manage one or more service defining layers. Specifically, the OMCI may model data flow between the OLT 110 and the ONUs 120 using a protocol-independent management information base (MIB) comprising a plurality of MEs. Such a configuration is described in the OMCI for GPON, ITU-T G.984.4 and its amendments, which are incorporated herein by reference as if reproduced in its entirety. In the OMCI, the customer packets may be mapped to GPON Encapsulation Method (GEM) ports using Virtual Local Area Networking (VLAN) filtering, as described in IEEE 802.1p, which is incorporated herein by reference as if reproduced in its entirety.

The OMCI at the ONU may be implemented using software, hardware, or both, where new MEs may be added to support additional or new capabilities, e.g. capabilities that meet different customer needs. Each ME in the OMCI may comprise a data architecture that represents a resource and/or service supported by the OMCI. For example, the ME may describe the purpose of the ME, the relationship between the ME and other MEs, the attribute(s) of the ME, or combinations thereof. The ME may comprise a plurality of attributes, properties, attribute properties, or combinations thereof. The OMCI may be described in the ITU-T recommendation G.983.2, entitled "ONU Management and Control Interface Specification for B-PON," ITU-T recommendation G.984.4, entitled "Gigabit-Capable Passive Optical Networks (G-PON): ONU Management and Control Interface Specification," or ITU-T recommendation G.988, entitled "ONU Management and Control Interface (OMCI) specification," all of which are incorporated herein by reference as if reproduced in their entirety.

In an embodiment, the OMCI may comprise an Enhanced Security Control ME that improves security in PON systems. The Enhanced Security Control ME may provide additional security features and/or functions, which may comprise a security capability discovery function, an ONU authentication function, an OLT authentication function, and a key privacy function. The OMCI ME may comprise a plurality of attributes, e.g. tables and/or parameters, that support the security functions, such as those described in conjunction with FIG. 2 below.

The security capability discovery function may enable one of the OLT or the ONU to discover the existence and/or availability of one or more security capabilities of the other component. The security capability discovery function may also enable the network component to discover one or more security algorithms that support a security capability of the other component. Additionally, the security capability function may enable the component to select which of the security algorithms to activate. In an embodiment, the OLT may use the security capability discovery function to inform the ONU, via the OMCI channel, of the security capabilities and/or algorithms that may be provided by the OLT. The security capabilities and/or algorithms may be provided to the ONU in one or more readable and/or writeable attributes at the ONU, e.g. in the enhanced security control ME at the ONU. The OLT may also use the security capability discovery function to receive from the ONU via the OMCI channel, the security capabilities, and/or algorithms supported by the ONU. The security capabilities and/or algorithms may be located in one or more readable attributes, e.g. in the Enhanced Security Control ME at the ONU, and may indicate the existence of a security capability and/or define the ONU's level of support for a particular capability and/or algorithm.

Additionally, the security capability discovery function may allow the OLT to specify one or more security algorithms that may be used to provide the ONU authentication function, the OLT authentication function, the key privacy function, or combinations thereof. In some embodiments, one or more of these security function capabilities/algorithms may be specified by an administrator instead of the OLT or the ONU. The security capabilities/algorithms may be specified as part of the security capability discovery function, e.g. before initiating the ONU authentication function, the OLT authentication function, and/or the key privacy function. Alternatively, the capabilities/algorithms may be specified as part of establishing the different security functions.

The ONU authentication function may enable the OLT to verify that the ONU is an authorized user and/or satisfies one or more security qualification criteria. In an embodiment, the OLT may exchange information for ONU authentication with the ONU via the OMCI channel. For instance, the ONU authentication procedure may comprise a challenge-response authentication procedure, which may be established between the OLT and the ONU using the OMCI channel. The challenge-response authentication procedure may be similar to the authentication procedure described in Federal Information Processing Standards (FIPS) publication No. 180-3, entitled "Specifications for the Secure Hash Standard", which is incorporated herein by reference as if reproduced in its entirety. During a challenge-response authentication procedure, the OLT may send a challenge in the form of a nonce, e.g. a random generated number, to the ONU via the OMCI channel. Subsequently, the ONU may send a response that comprises a hashed combination of the nonce and a mutually shared secret to the OLT via the OMCI channel. For instance, the OLT may write the nonce in the OMCI ME of the ONU, and then read the hashed combination from the OMCI ME. The OLT may authenticate the ONU by verifying that the hashed combination is substantially equal to an ONU authentication value which may be calculated by the OLT independent of the hashed combination. In some embodiments, the OLT may send an ONU authentication confirmation message to the ONU, via the OMCI channel, after determining that the hashed combination is substantially equal to the ONU authentication value. The ONU authentication confirmation message may indicate that the ONU has been authenticated by the OLT.

The OLT authentication function may enable the ONU to verify that the OLT is a legitimate OLT, e.g. assigned to the ONU and/or satisfies one or more security qualification criteria. In an embodiment, the ONU may exchange information necessary for OLT authentication with the OLT via the OMCI channel. For instance, the OLT authentication may comprise a challenge-response authentication procedure, which may be established between the OLT and the ONU using the OMCI channel. During a challenge-response authentication procedure, the ONU may send a challenge in the form of a nonce, to the OLT via the OMCI channel. In response, the OLT may send a message containing a hashed combination of the nonce and a mutually shared secret to the ONU via the OMCI channel. For instance, the OLT may read a nonce from the OMCI ME at the ONU, and then write the hashed combination at the OMCI ME. The ONU may compare the hashed combination with an OLT authentication value that is calculated by the ONU to authenticate the OLT. In some embodiments, the ONU may send an OLT authentication confirmation message to the OLT via the OMCI channel after confirming that the hashed combination is substantially equal to the OLT authentication value. The hashed combination and the OLT authentication value may be calculated independently by the OLT and the ONU, respectively. Further, the nonce and the hashed combination used in the OLT authentication procedure may be different than the nonce and the hashed combination used in the ONU authentication procedure.

The key privacy function may allow the OLT and the ONU to securely exchange encryption keys. For instance, the key privacy function may allow the OLT and the ONU to exchange encrypted key information via the PLOAM channel. The key privacy function may also allow the OLT and ONU to exchange encrypted key information via the OMCI channel. The key information may comprise any information that is used to establish an encryption protocol. The key information may be associated with a public key protocol that utilizes an asymmetric key algorithm. Some common techniques that may be used in public-key cryptography may be described in the IEEE standard 1363, entitled "Standard Specifications For Public-Key Cryptography", which is incorporated herein by reference as if reproduced in its entirety. Public-key cryptography may comprise a method for encrypting data using a public key and decrypting data using a private key, where the public key may be widely distributed and the private key may be kept secret. In such cases, the private key may not be derived mathematically from the public key, and as such an attacker that does not have possession of the public key may be prevented from decoding an encrypted message. For instance, the key privacy function may allow the OLT to write a public key to the OMCI at the ONU. The ONU may then encrypt an Advanced Encryption Standard (AES) key with the public key, and send the encrypted key over the PLOAM channel. Subsequently, the OLT may obtain the encrypted key and obtain the AES key from the encrypted key.

In different embodiments, the security capability discovery function, the ONU authentication function, the OLT authentication function, and the key privacy function may be consolidated into a single authentication function or performed concurrently. In some embodiments, the OLT may exchange with the ONU, via the OMCI channel, cryptographic capabilities, authentication information, and/or key information that belong to the OLT and/or the ONU, e.g. by reading and/or writing a plurality of attributes in the Enhanced Security Control ME. The attributes may be exchanged in an authentication message exchange sequence as described in detail below.

Figure 2:
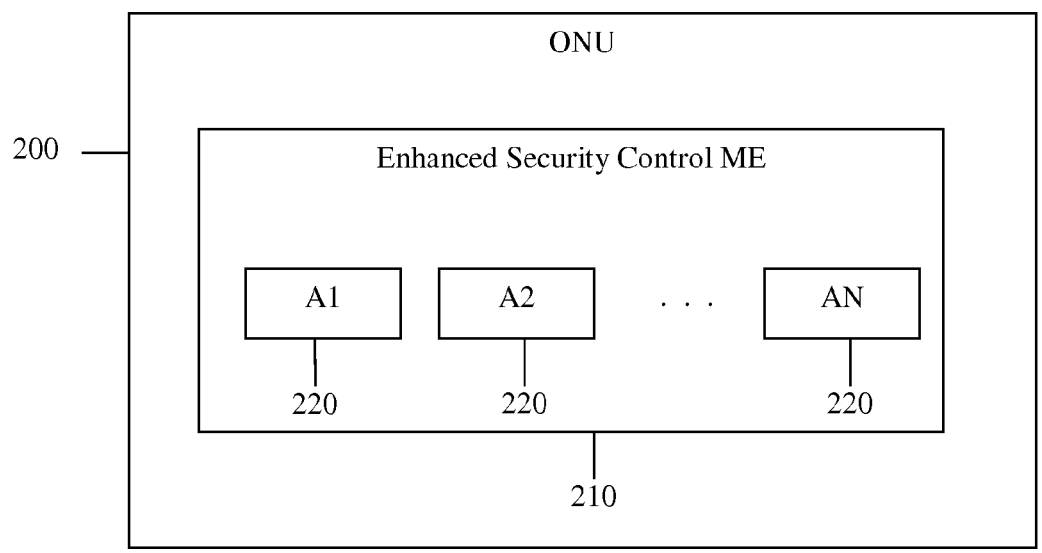
FIG. 2 is a schematic diagram of an embodiment of an ONU.

FIG. 2 illustrates one embodiment of an ONU 200, which may comprise an Enhanced Security Control ME 210. The Enhanced Security Control ME 210 may comprise a plurality of ME attributes 220 (e.g. A1-AN). These ME attributes 220 may represent data structures, e.g. tables, parameters, and/or system variables, that may comprise data describing different characteristics of the ONU and/or in an authentication message exchange sequence. The ME attributes 220 may comprise an ME identifier (ID) attribute, an OLT crypto capabilities attribute, an OLT random challenge table attribute, an OLT challenge status attribute, an ONU selected crypto capabilities attribute, an ONU random challenge table attribute, an ONU authentication result table attribute, an OLT authentication result table attribute, an OLT result status attribute, an ONU authentication state attribute, a master session key name attribute, a broadcast key table attribute, an effective key length attribute, or combinations thereof. These attributes may be used to support or provide security features and/or functions, such as in the security capability discovery function, the ONU authentication function, the OLT authentication function, the key privacy function, or combinations thereof. As such, some of the ME attributes 220 may be used separately in different security functions or jointly in a combined security function that consolidates at least some of the security functions. For instance, the ME attributes 220 may be used to implement a symmetric-key-based three step authentication process.

The ME ID attribute may be used to identify each instance of the Enhanced Security Control ME 210. In an embodiment, there may be a single instance of the Enhanced Security Control ME 210 associated with the ONU, where the instance may have an ME ID value equal to about zero. In other embodiments, there may be multiple instances of the Enhanced Security Control ME 210 associated with the ONU, where each instance may have a different ME ID value. The ME ID attribute may be readable and about two bytes in length.

The OLT crypto capabilities attribute may specify one or more of the cryptographic mechanisms available or supported by the OLT. In an embodiment, the OLT crypto capabilities attribute may be formatted as a bitmap, where each of the bits in the bitmap may correspond to an algorithm, e.g. as shown in Table 1. Accordingly, a bit may be set to about one to indicate that a corresponding cryptographic or authentication algorithm is supported by the OLT, or to about zero to indicate that the corresponding algorithm is not supported by the OLT. The OLT crypto capabilities attribute may be writeable and about 16 bytes in length. In some cases, each bit in the OLT crypto capabilities attribute may be set to about zero to indicate that the OLT does not support any algorithms.

Table 1 describes an embodiment of the OLT crypto capabilities attribute bitmap. Specifically, different bit positions in the bitmap may correspond to different cryptographic algorithms. For example, bit position one (the least significant bit (LSB)) may correspond to an AES-Cipher-based Message Authentication Code (CMAC)-128 algorithm, bit position two may correspond to an HMAC-SHA-256 algorithm, bit position three may correspond to a Hash-based Message Authentication Code (HMAC)-Secure Hash Algorithm (SHA)-512 algorithm, and bit positions four to about 128 may be reserved.

TABLE 1

| Bit position | Algorithm |
| --- | --- |
| 1 (LSB) | AES-CMAC-128 |
| 2 | HMAC-SHA-256 |
| 3 | HMAC-SHA-512 |
| 4-128 | Reserved |

The OLT random challenge table attribute may specify a random challenge issued by the OLT during an authentication sequence. In an embodiment, the OLT random challenge table attribute may be a table that comprises N entries (N is an integer), which may be determined by an administrator. Each entry in the data table may have a fixed length, e.g. about 17 bytes, where the first byte of each entry may comprise an entry index or entry identifier and the remaining bytes of each entry may comprise content. The OLT may write the entries in the table and then trigger the ONU to process the table entries, e.g. using the OLT challenge status attribute. Since the OLT random challenge table attribute may have a variable number of entries (e.g. N), the length and therefore the complexity of the random challenge may be increased to improve the security of the authentication function if needed. The OLT random challenge table attribute may be readable, writeable, and about 17×N bytes in length.

The OLT challenge status attribute may be used to control and report the status of the OLT crypto capabilities attribute and/or the OLT random challenge table attribute. In an embodiment, the OLT challenge status attribute may be a boolean attribute that may be set to a first or true boolean value (e.g. about one) when the OLT crypto capabilities attribute and/or the OLT random challenge table attribute are complete or to a second or false boolean value (e.g. about zero) when the OLT crypto capabilities attribute and/or the OLT random challenge table attribute are not complete. For instance, the OLT may set the OLT challenge status attribute to the false value (e.g. about zero) before or while writing to the OLT crypto capabilities attribute and/or the OLT random challenge table attribute. Subsequently, the OLT may set the OLT challenge status attribute to a true value (e.g. about one) upon completing the process of writing to the OLT crypto capabilities attribute and/or the OLT random challenge table attribute. The OLT may set the OLT challenge status attribute to the false value, write a plurality of entries in the OLT crypto capabilities attribute and/or the OLT random challenge table attribute, set the OLT challenge status attribute to the true value, and thus trigger the ONU to process the contents of the OLT crypto capabilities attribute and/or the OLT random challenge table attribute. The OLT challenge status attribute may be readable, writeable, and about one byte in length.

The ONU selected crypto capabilities attribute may specify a cryptographic capability that is selected by the ONU, e.g. in an authentication sequence. The ONU selected crypto capabilities attribute may be set to a value that indicates an algorithm supported by the OLT, e.g. in the OLT crypto capabilities attribute. The value may specify one of the bit positions that was set to about one in the OLT crypto capabilities attribute.

The ONU random challenge table attribute may specify a random challenge issued by the ONU during the authentication sequence. In an embodiment, the ONU random challenge table attribute may be a table that comprises P entries (P is an integer), which may be set by an administrator. Each entry in the data table may have a fixed length, e.g. about 16 bytes, where the first byte of each entry may comprise an entry index or entry identifier and the remaining bytes of each entry may comprise content. The ONU may write the ONU random challenge table attribute in response to the OLT generating the OLT challenge status attribute. After generating the ONU random challenge table attribute, the ONU may notify the OLT, e.g. using an attribute value change (AVC) action, that the challenge table is established to trigger the OLT to begin a get/get-next sequence to obtain the table's content. Since the ONU random challenge table attribute may have a variable number of entries, the length and therefore the complexity of the random challenge may be increased to improve the security of the authentication function. The ONU random challenge table attribute may be readable and about 16×P bytes in length.

The ONU authentication result table attribute may specify a result of the authentication challenge from the ONU according to the ONU's selected crypto capabilities attribute. The value of the ONU authentication result table attribute may be generated using a hash function selected by the ONU, such as:

SelectedHashFunction (PSK, (ONU_selected_crypto_capabilities | OLT_random_challenge_table | ONU_random_challenge_table | 0X0000 0000 0000 0000)), where "|" denotes concatenation and ONU_selected_crypto_capabilities represents the crypto capabilities selected by the ONU.

In an embodiment, the ONU authentication result table attribute may be a data table that comprises Q entries (Q is an integer), which may be determined by an administrator. Each entry in the data table may have a fixed length, e.g. about 16 bytes. The ONU may write the ONU authentication result table attribute in response to the OLT generating the OLT challenge status attribute. After generating the ONU authentication result table attribute, the ONU may notify the OLT, e.g. using an AVC message or notification, that the table is established to trigger the OLT to begin a get/get-next sequence to obtain the table's content. Since the ONU authentication response table attribute may have a variable number of entries, the length and therefore complexity of the hash combination may be increased to improve the security of the ONU authentication function if needed. The ONU authentication result table attribute may be readable and about 16×Q bytes in length.

The OLT authentication result table attribute may specify a result of the authentication calculation from the OLT. The value of the OLT authentication result table attribute may be generated using a hash function selected by the OLT, such as:

SelectedHashFunction (PSK, (ONU_selected_crypto_capabilities | ONU_random_challenge_table | OLT_random_challenge_table | ONU_serial_number)), where ONU_serial_number is the serial number of the ONU ME, which may be specified by an ONU serial number attribute.

In an embodiment, the OLT authentication result table attribute may be a data table that comprises R entries (R is an integer), which may be set by an administrator. Each entry in the data table may have a fixed length, e.g. about 17 bytes, where the first byte of each entry may comprise an entry index or entry identifier and where the remaining bytes of each entry may comprise content. The OLT may write the entries in the OLT authentication result table attribute and then trigger the ONU to process the table with the OLT result status attribute. Since the OLT authentication result table may have a variable number of entries, the length and therefore the complexity, of the result may be increased to improve the security of the OLT authentication function as needed. The OLT authentication response table may be writeable and about 17×R bytes in length.

The OLT result status attribute may be used to control and/or report the status of the OLT authentication result table attribute. In an embodiment, the OLT result status attribute may be a boolean attribute that may be set to a true value of about one when the ONU authentication result table attribute is complete or to a false boolean value of about zero when the ONU authentication result table attribute is not complete. For instance, the OLT may set the OLT result status attribute to false (e.g. about zero) before or while writing to the OLT authentication result table attribute, and subsequently to true (e.g. about one) upon completing the process of writing the result to the OLT authentication result table attribute. The OLT may set the OLT authentication result status attribute to false write a plurality of entries to the OLT authentication result table attribute, set the OLT result status attribute to true, and thus trigger the ONU to process the OLT result table attribute. The OLT result status attribute may be readable, writeable, and about one byte in length.

The ONU authentication state attribute may indicate the state of the authentication relationship from the perspective of the ONU. The ONU authentication state attribute may have a value of about zero to indicate that the ONU is in an inactive state S0, e.g. where the authentication procedure is not active. The ONU authentication state attribute may have a value of about one to indicate that the ONU is in an OLT challenge pending state S1, e.g. when the authentication procedure is in process. The ONU authentication state attribute may have a value of about two to indicate that the ONU is in an ONU challenge pending state S2. The ONU authentication state attribute may have a value of about three to indicate that the ONU is in an authentication success state S3, e.g. when the authentication procedure is completed and the ONU has authenticated the OLT. The ONU authentication state attribute may have a value of about four to indicate that the ONU is in an authentication failure state S4, e.g. when the authentication procedure is completed and the ONU has not authenticated the OLT. Alternatively, the ONU authentication state attribute may have a value of about five to indicate that the ONU is in an authentication error state S5, e.g. when the authentication procedure has started but could not be completed. When the ONU authentication attribute has a value of about three, e.g. in the authentication success state S2, a plurality of encryption keys may be exchanged in their encrypted form, e.g. using a master session key as described in G.984 or a key encryption key as described in G. 987, both of which are incorporated herein as if reproduced in their entirety. The OLT may check the value of the ONU authentication state attribute before initiating a key switch. Additionally, the OLT may be alerted of a change in the status of the ONU authentication state attribute, e.g. a change from state S1 to state S2, by receiving an AVC message or notification from the ONU via the OMCI channel. The ONU authentication state attribute may be readable and 1 byte in length.

The master session key name attribute may comprise the name of the current session key, e.g. after a successful authentication. A master session key may be defined by a hash function selected by the ONU, such as SelectedHashFunction (PSK, (OLT_random_challenge|ONU_random_challenge)). The master session key name attribute may be defined as:

SelectedHashFunction (PSK, (ONU_random_challenge|OLT_random_challenge|0x 3141 5926 5358 9793 3141 5926 5358 9793)), where the number 0x 3141 5926 5358 9793 3141 5926 5358 9793 is an example of an ONU serial number. If the selected hash function generates more then about 128 bits, the result may be truncated to the leftmost, e.g. the most significant, about 128 bits. Upon the termination of a master sessions key, e.g. due to an ONU reset or ONU local decision that the master key has expired, the ONU may set the master session key name attribute to a sequence of about zero. The master session key name attribute may be readable and about 16 bytes in length.

The broadcast key table attribute may comprise a broadcast key generated by the OLT. The broadcast key table attribute may comprise a table that comprises one or more rows. Each row may comprise a row control portion, a row identifier portion, and a key fragment portion. The row control may comprise about one byte, the row identifier may also comprise about one byte, and the key fragment may comprise about 16 bytes. As such, the broadcast key table attribute may be readable and writeable, optional, and about 18*N bytes in length.

The row control may describe the action to be taken on a specified row, e.g. the row specified by the row identifier. About two LSBs in the row control may determine the attribute's behavior under a set action, e.g. as shown in Table 2. In Table 2, the two LSBs may be set to about 00 to set the specified row, to about 01 to clear the specified row, to about 10 to clear the entire table, or to about 11 to indicate a reserved entry. Further, about four most significant bits (MSBs) in the row control may specify the length of the corresponding key fragment. The remaining two bits in the row control may be reserved. The two LSBs of the row control may be read as about zero under the get-next action and may behave in a manner consistent with Table 2 under the set action.

TABLE 2

| LSBs | Behavior under set action |
| --- | --- |
| 00 | Set the specified row. |
| 01 | Clear the specified row. |
| 10 | Clear the entire table. |
| 11 | Reserved |

The row identifier may identify the specified row. About two MSBs in the row identifier may represent the key index, which may appear at the header of an encrypted multicast GPON Encapsulation Method (GEM) frame. A key index of about zero may indicate a clear text, and thus may not appear in the row identifier. About four LSBs in the row identifier may identify the key fragment number and may start from about zero. The remaining about two bits in the row identifier may be reserved. The key fragment may comprise a specified key portion, e.g. specified by the ONU. For example the key portion may be encrypted with the AES-Electronic codebook (ECB) using key encrypt key (KEK).

The effective key length attribute may specify a maximum effective length (e.g. in bits) of the keys generated by the ONU. The effective key length attribute may be readable, optional, and about two bytes in length.

Additionally or alternatively, the ME attributes 220 may comprise an authentication capability attribute, an ONU authentication selection attribute, an ONU authentication nonce table attribute, an ONU authentication nonce status attribute, an ONU authentication response table attribute, or combinations thereof. The ME attributes 220 may also comprise an OLT authentication selection attribute, an OLT authentication nonce table attribute, an OLT authentication response table attribute, an OLT authentication response status attribute, an OLT public key capability attribute, an OLT public key selection attribute, an OLT public key table attribute, an OLT public key table attribute, or combinations thereof.

The authentication capability attribute may specify the authentication mechanisms available at the ONU and/or the authentication algorithms supported by the ONU. In an embodiment, the authentication capability attribute may be formatted as a bitmap, where some or all of the bits in the bitmap may correspond to an authentication algorithm, for example according to Table 3. Accordingly, a bit may be set to about one to indicate that a corresponding authentication algorithm is supported by the ONU, or to about zero to indicate that the corresponding authentication algorithm is not supported by the ONU. The authentication capability attribute may be readable and about 16 bytes in length. In some cases, each bit in the authentication capability attribute may be set to about zero to indicate that no authentication algorithms are supported by the ONU.

TABLE 3

| Bit position (LSB = 1, MSB = 64) | Algorithm Supported |
| --- | --- |
| 0 | SHA3 |
| 1 | MD5 |

The ONU authentication selection attribute may specify an authentication algorithm to be used during the ONU authentication function. For instance, the ONU authentication selection attribute may be set to a value that indicates an authentication algorithm supported by the ONU. The value may indicate an authentication algorithm that may be listed in the authentication capability attribute. The ONU authentication selection attribute may be used to instruct the ONU to use the corresponding authentication algorithm to generate a hash combination, e.g. during the implementation of ONU authentication function. The ONU authentication selection attribute may be readable, writeable, and about one byte in length. The ONU authentication selection attribute may also be set to about zero to indicate that no authentication algorithm is used in the ONU authentication function.

The ONU authentication nonce table attribute may specify a nonce that is used for the ONU authentication function. The nonce may be a random or pseudo-random number generated for the purpose of increasing the security of the ONU authentication function. In an embodiment, the ONU authentication nonce table may be a data table that comprises N entries (N is an integer) that may be determined by an administrator. Each entry in the data table may have a fixed length, e.g. about 25 bytes, where the first byte of each entry may comprise an entry index or entry identifier and the remaining bytes of each entry may comprise content. Since the ONU authentication nonce table may have a variable number of entries (e.g. N), the length and therefore the complexity of the nonce may be increased to improve the security of the ONU authentication function if needed. The ONU authentication nonce table may be readable and about 25×N bytes in length.

The ONU authentication nonce status attribute may be used to control and report the status of the ONU authentication nonce table attribute during the ONU authentication function. In an embodiment, the ONU authentication nonce status attribute may be set to a first or true boolean value (e.g. about one) when the ONU authentication table is complete or to a second or false boolean value (e.g. about zero) when the ONU authentication table is incomplete. For instance, the OLT may set the ONU authentication nonce status to the false value of about zero upon initiating the process of writing the nonce to the ONU authentication nonce table attribute, and subsequently to a true value of about one upon completing the process of writing the nonce to the ONU authentication nonce table attribute. In an embodiment, the OLT may set the ONU authentication nonce status attribute to the false value, write a plurality of entries in the ONU authentication nonce table attribute, set the ONU authentication nonce status attribute to the true value, and thus trigger the ONU to process the ONU authentication nonce table attribute. The ONU authentication nonce status attribute may be readable, writeable, and about one byte in length.

The ONU authentication response table attribute may specify a response, e.g. the hash combination, that may be used in the ONU authentication function. The ONU authentication response table attribute may comprise a hash combination that is calculated by the ONU. The hash combination may be calculated by processing the nonce, e.g. the contents of the ONU authentication nonce table attribute, using an authentication algorithm that is specified by the ONU authentication selection attribute. The OLT may obtain the hash combination by reading the ONU authentication response table attribute. The OLT may then authenticate the ONU by confirming that the hash combination is substantially equal to ONU authentication value. In an embodiment, the ONU authentication response table attribute may be a data table that comprises M entries (M is an integer) that may be determined by an administrator. Each entry in the data table may have a fixed length, e.g. about 25 bytes, where the first byte of each entry may comprise an entry index or entry identifier and the remaining bytes of each entry may comprise content. Since the ONU authentication response table attribute may have a variable number of entries, the length and therefore complexity of the hash combination may be increased to improve the security of the ONU authentication function if needed. The ONU authentication response table attribute may be readable and about 25×M bytes in length.

The OLT authentication selection attribute may specify an authentication mechanism to be used during the OLT authentication function. In an embodiment, the OLT authentication selection attribute may be set to a value that indicates an authentication algorithm supported by the ONU. The value may correspond to an authentication algorithm listed in the authentication capability attribute. The OLT authentication selection attribute may instruct the ONU to use a specified authentication algorithm to generate a hash combination during the OLT authentication function. The OLT authentication selection attribute may be readable, writeable, and about one byte in length. The OLT authentication selection attribute may also be set to about zero to indicate that no authentication algorithm is used during the OLT authentication function.

The OLT authentication nonce table attribute may specify a nonce to be used in the OLT authentication function. The nonce may be generated to improve the security of the OLT authentication function. In an embodiment, the OLT authentication nonce table may be a data table that comprises P entries (P is an integer) that may be set by an administrator. Each entry in the data table may have a fixed length, e.g. about 25 bytes, where the first byte of each entry may comprise an entry index or entry identifier and the remaining bytes of each entry may comprise content. Since the OLT authentication nonce table attribute may have a variable number of entries, the length and therefore the complexity of the nonce may be increased to improve the security of the OLT authentication function. The ONU authentication nonce table attribute may be readable and about 25×P bytes in length.

The OLT authentication response table attribute may specify the response, e.g. the hash combination, to be used in the OLT authentication function. The OLT authentication response table attribute may comprise the hash combination that may be calculated by the OLT. The OLT may calculate the hash combination by processing the nonce in the OLT authentication nonce table attribute using the authentication algorithm specified in the OLT authentication selection attribute. As such, the ONU may read the OLT authentication response table attribute to obtain the hash combination value. The ONU may then authenticate the OLT by confirming that the hash combination value is substantially similar to an OLT authentication value. In an embodiment, the OLT authentication response table may be a data table that comprises Q entries (Q is an integer) that may be set by an administrator. Each entry in the data table may have a fixed length, e.g. about 25 bytes, where the first byte of each entry may comprise an entry index or entry identifier and where the remaining bytes of each entry may comprise content. Since the ONU authentication response table may have a variable number of entries, the length and therefore the complexity, of the hash combination may be increased to improve the security of the OLT authentication function as needed. The OLT authentication response table may be readable and about 25×Q bytes in length.

The OLT authentication response status attribute may be used to control and/or report the status of the OLT authentication response table attribute during the OLT authentication function. In an embodiment, the OLT authentication response status attribute may be set to a true boolean value of about one when the ONU authentication table is complete or to a false boolean value of about zero when the ONU authentication table is incomplete. For instance, the OLT may set the OLT authentication response status to false, e.g. about zero, upon initiating the process of writing the nonce to the OLT authentication response table attribute, and subsequently to true, e.g. about one, upon completing the process of writing the nonce to the OLT authentication response table attribute. In an embodiment, the OLT may set the OLT authentication response status attribute to false, e.g. about zero, write a plurality of entries to the OLT authentication response table attribute, set the OLT authentication response status attribute to true (e.g. about one), and thus trigger the ONU to process the OLT authentication response table attribute accordingly. The OLT authentication response status attribute may be readable, writeable, and about one byte in length.

The OLT public key capability attribute may specify the public key mechanisms available at the ONU 200. In an embodiment, the OLT public key capability attribute may be formatted as a bitmap, where some or all of the bits in the bitmap may correspond to a specific public key algorithm, for example according to Table 4. For instance, a bit set to about one may indicate that the corresponding public key algorithm is supported by the ONU and a bit set to about zero may indicate that the corresponding public key algorithm is not supported by the ONU 200. The OLT public key capability attribute may be readable and about 16 bytes in length. In some embodiments, each bit in the OLT public key capability attribute may be set to about zero to indicate that no public key algorithms are supported by the OLT 200.

TABLE 4

| Bit position (LSB = 1, MSB = 64) | Algorithm Supported |
|---|---|
| 0 | Rivest-Shamir-Adleman (RSA) |
| 1 | Elliptic Curve |

The OLT public key selection attribute may specify the public key mechanism to use during the key privacy function. In an embodiment, the OLT public key selection attribute may be set to a value that indicates an authentication algorithm supported by the ONU 200, e.g. as specified by the OLT public key capability attribute. In an embodiment, the OLT public key selection attribute may be used to instruct the ONU to use the specified public key algorithm to encrypt the AES key during the key privacy function. The OLT public key selection attribute may be readable, writeable, and about one byte in length. In some embodiments, the OLT public key selection attribute may be set to about zero to indicate that no public key algorithm is used.

The OLT public key table attribute may specify the public key to be used during the key privacy function. In an embodiment, the OLT may write the public key to the OLT public key table attribute. The OLT public key table attribute may be a table that comprises R entries (R is an integer) that may be by an administrator. Each entry in the table may have a fixed length, e.g. about 25 bytes, where the first byte of each entry may comprise an entry index or entry identifier and where the remaining bytes of each entry may comprise content. Since the OLT public key table attribute may have a variable number of entries, the length and therefore the complexity of the public key may be increased to improve the security of the key privacy function as needed. The OLT public key table attribute may be readable, writeable, and about 25×R bytes in length.

The OLT public key status attribute may be used to control and/or report the status of the OLT public key table attribute during the key privacy function. In an embodiment, the OLT public key status attribute may be set to a true boolean value, e.g. about one, when the public key table is complete or to a false boolean value, e.g. about zero, when the public key table is incomplete. For instance, the OLT may set the OLT public key status to false, e.g. about zero, upon initiating the process of writing the public key to the OLT public key table attribute, and subsequently set the OLT public key status to true, e.g. about one, upon completing the process of writing the public key to the OLT public key table attribute. In an embodiment, the OLT may set the OLT public key status attribute to false, e.g. about zero, write a plurality of entries to the OLT public key table attribute, set the OLT public key status attribute to true, e.g. about one, and thus trigger the ONU to process the OLT public key table attribute accordingly. The OLT authentication response status attribute may be readable, writeable, and about one byte in length.

The OLT may use various actions, e.g. instruction types, when communicating with the ONU via the OMCI channel, such as a get action, a get-next action, and a set action. The get action may allow the OLT to read one or more attributes of the OMCI ME at the ONU, the get-next action may allow the OLT to read a string or collection of attributes of the OMCI ME, and the set action may allow the ONU to write to one or more attributes of the OMCI ME.

The OLT may also receive one or more OMCI notifications during the security functions. The OMCI notifications may be received in the form of AVC messages, which may be communicated via the OMCI channel. Each AVC message may have a numerical value, that may correspond to a different message type, e.g. as shown in Table 5A or 5B. For instance, as shown in Table 5A, an AVC message associated with the ONU random challenge table attribute may be assigned a value of about five. An AVC message associated with the ONU authentication result table attribute may be assigned a value of about six. An AVC message associated with the ONU authentication status attribute may be assigned a value of about 10. The remaining values, e.g. from about one to about four, from about seven to about nine, and from about eleven to about sixteen, may be reserved.

TABLE 5A

| Attribute Number | value change | Description |
|---|---|---|
| 1...4 | Reserved | |
| 5 | ONU random challenge table | A new ONU challenge has been loaded into the table for the OLT to retrieve |
| 6 | ONU authentication result table | A new ONU response has been loaded into table for the OLT to retrieve |
| 7...9 | Reserved | |
| 10 | ONU authentication status | The ONU authentication status has changed |
| 11...16 | Reserved | |

TABLE 5B

| Attribute Number | value change | Description |
|---|---|---|
| 1...7 | N/A | |
| 8 | ONU authentication response change | A new ONU response has been loaded into the table for the OLT to retrieve |
| 9 | OLT authentication nonce change | A new ONU nonce has been loaded into the table for the OLT to retrieve |
| 10-13 | N/A | |
| 14...16 | Reserved | |

In an embodiment, the Enhanced Security Control ME may comprise a plurality of facilities to perform a conventional three step hash-based authentication sequence, e.g. as described in the International Standards Organization (ISO)/International Electrotechnical Commission (IEC) publication 9798-4 entitled, "Information technology—Security Techniques—Entity Authentication—Part 4: Mechanisms using a cryptographic check function", which is incorporated herein by reference as if reproduced in its entirety. The conventional three step authentication sequence may be used in DSL systems that employ a MS-CHAPv2 protocol, or other systems that may use get and set messages. The logical structure of the conventional three step sequence may comprise messages, e.g. message 1, message 2, and message 3, such as:

Message 1: (Peer 1 → peer 2) my_cryptographic_capabilities |
random_challenge_1,
Message 2: (Peer 2 → peer 1): selected_cryptographic_capabilities |
random_challenge_2 |
    MsgHash (PSK, (selected_cryptographic_capabilities |
    random_challenge_1 |
    random_challenge_2, peer_1_identity)), and
Message 3: (Peer 1 → peer 2): MsgHash (PSK,
(selected_cryptographic_capabilities |
    random_challenge_2 | random_challenge_1 |
    peer_2_identity)), where MsgHash ( ) is a keyed hash function of the message, PSK is the pre-shared key known only to the peers of the session, Peer_1_identity is set to about 0x0000 0000 0000 0000, and Peer_2_identity is the ONU serial number.

One prerequisite for using the three-step hash-based authentication sequence may be the availability of a pre-shared secret (PSK). A PSK of about 128 bits may simplify the application of security algorithms based on an AES-128 (e.g. AES-CMAC-128). A PSK may be associated with an ONU and may be stored at that ONU and at the operator infrastructure. On the operator side, the PSK for the ONU may be stored in the OLT that is coupled to the ONU or at a central server that the OLT may access during authentication. The configuration of the PSK into the ONU and into the operator infrastructure may be performed in any manner that satisfies these requirements.

Figure 3:
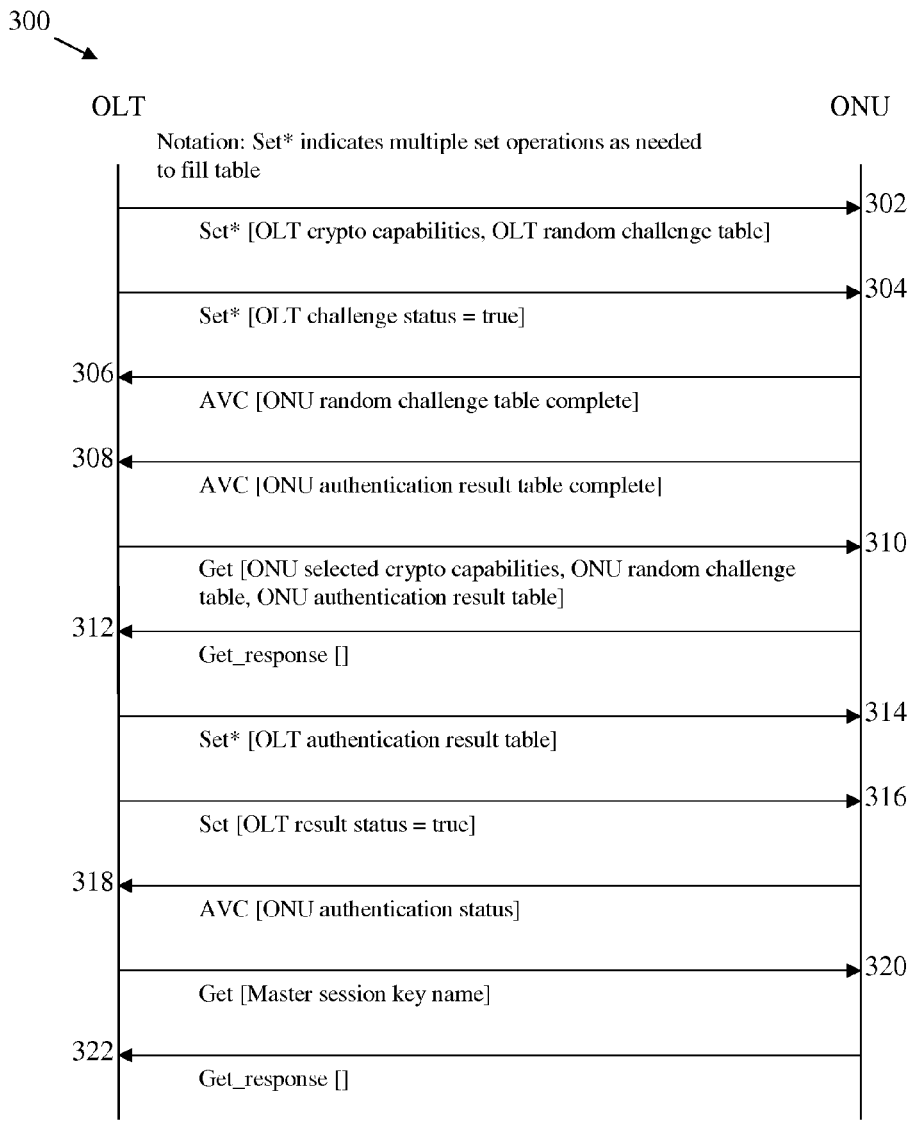
FIG. 3 is a protocol diagram of an embodiment of an authentication message exchange sequence.

FIG. 3 illustrates an embodiment of an authentication message exchange sequence 300, which may be established between the OLT and the ONU in the OMCI channel. The authentication message exchange sequence 300 may provide improved security in PON systems, e.g. for upstream and downstream transmissions. The authentication message exchange sequence 300 may comprise various actions, which may be implemented by the OLT, to communicate with the ONU via the OMCI channel and access the Enhanced Security Control ME. For instance, the OLT may write to various Enhanced Security Control ME attributes (e.g. ME attributes 220) by using the set action. The OLT may perform multiple set operations as needed to write multiple entries to one or more attributes by using the set action. The OLT may read from various Enhanced Security Control ME attributes by using the get function, which may trigger a get_response message that obtains the contents or part of the contents of one or more Enhanced Security Control ME attributes. Additionally, the OLT may receive one or more OMCI notifications in the form of AVC messages.

The authentication message exchange sequence 300 may begin at step 302, where the OLT may write to the OLT crypto capabilities attribute and/or the OLT random challenge table attribute using a set action. At step 304, the OLT may write a true value, e.g. about one, to the OLT challenge status attribute using a set action to indicate to the ONU that the OLT crypto capabilities attribute and/or the OLT random challenge table attributes are established. At step 306, the OLT may receive from the ONU an AVC message that notifies the OLT that the ONU random challenge table attribute is established. At step 308, the OLT may receive from the ONU an AVC message that notifies the OLT that the ONU authentication result table attribute is established.

At step 310, the OLT may request the ONU selected crypto capabilities attribute, the ONU random challenge table attribute, the ONU authentication result table attribute, or a combination thereof from the ONU using a get action. At step 312, the ONU may respond to the OLT by sending the requested information using a get_response action. At step 314, the OLT may write to the OLT authentication result table attribute using a set action. At step 316, the OLT may write a true value to the OLT result status attribute using a set action. At step 318, the OLT may receive from the ONU an AVC message that notifies the OLT that the ONU authentication status attribute is established. At step 320, the OLT may request the master session key name attribute from the ONU using a get action. At step 322, the ONU may respond to the OLT by sending the requested information using a get_response action. The authentication message exchange may then end.

Figure 4:
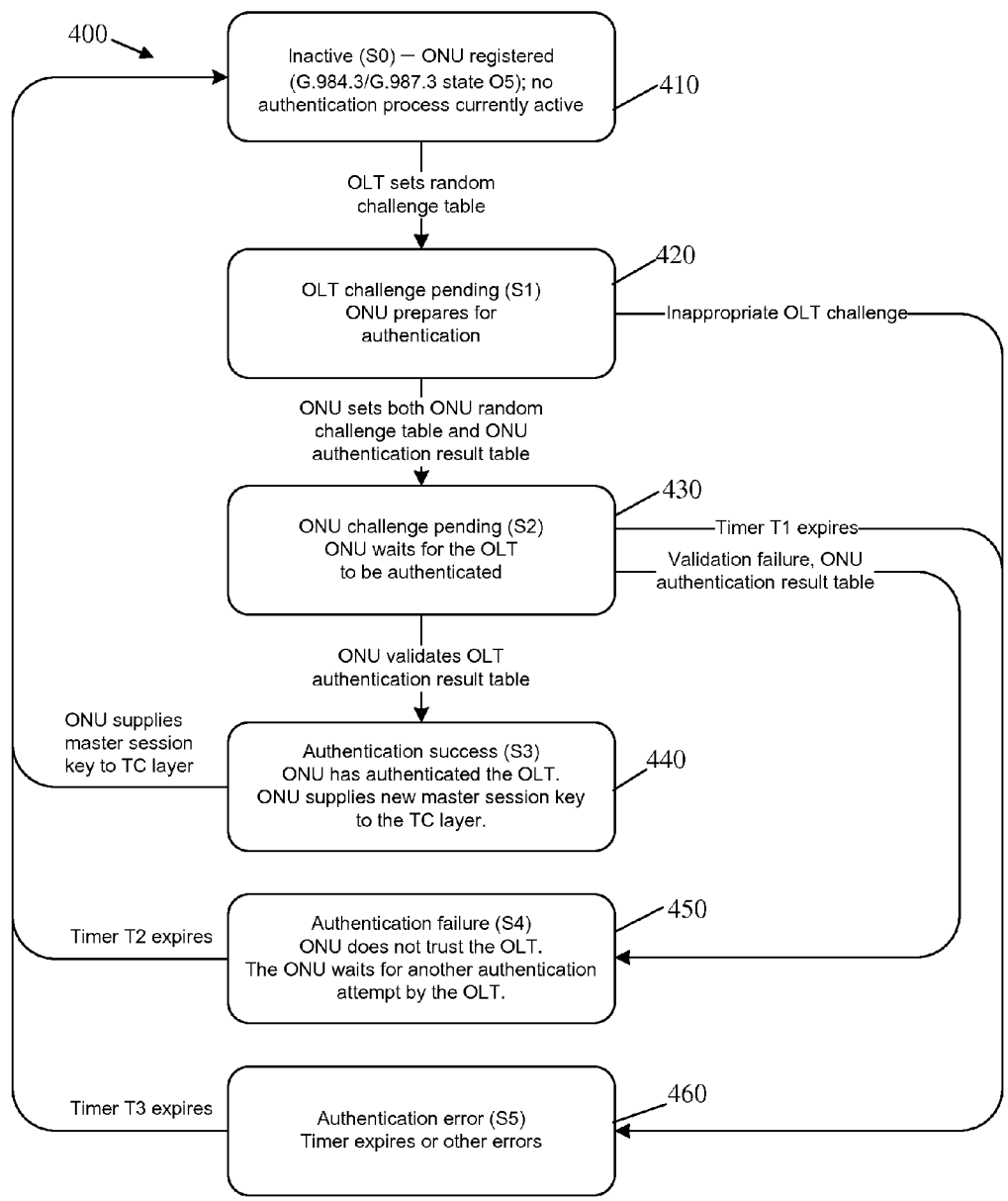
FIG. 4 is a schematic diagram of an embodiment of a plurality of ONU states.

FIG. 4 illustrates an embodiment of a plurality of ONU states 400. The ONU states 400 may be specified by a state machine, which may operate state O5 as defined in ITU-T G.784.3 and G987.3, which are incorporated herein by reference as if reproduced in their entirety. Initially at block 410, the ONU may be in an inactive state (S0), e.g. after the ONU registration. The state S0 may be indicated by the ONU authentication state attribute using a value of about zero. The OLT may then initiate an authentication process by writing a challenge to the OLT random challenge table attribute at the OMCI ME at the ONU.

At block 420, the OLT may enter a challenge pending state (S1), e.g. after the OLT writes its challenge to the OLT random challenge table attribute. The OLT challenge pending state (S1) may be indicated by the ONU authentication state attribute using a value of about one. During the state S1, the ONU may select the ONU random challenge attribute, and/or calculate the ONU authentication result table attribute, and the OLT may not write a new value into the OLT random challenge table attribute. The ONU may then transition to an ONU challenge pending state (S2) after selecting the ONU random challenge attribute and/or calculating the ONU authentication result table attribute. If the ONU is unable to perform the operations necessary to transition to the state S2, then the ONU may transition to an authentication error state (S5) instead of the state S2.

At block 430, the ONU may enter the state S2, e.g. after selecting the ONU random challenge attribute and/or calculating the ONU authentication result table attribute. The state S2 may be indicated by the ONU authentication state attribute using a value of about two. During the state S2, the ONU may wait for the OLT to read the relevant tables/attributes, e.g. the ONU selected crypto capabilities attribute, the ONU random challenge table attribute, the ONU authentication result table attribute, or combinations thereof, and write the result of the ONU's authentication challenge to the OLT authentication result table attribute. The OLT's response may be time limited. For instance, the OLT may need to respond to the ONU's authentication challenge before a timer period (T1) expires. For example, T1 may be set to expire in about three seconds. If the OLT fails to respond during the state S2 before T1 expires, the ONU may transition to the state S5. If the OLT responds before T1 expires, e.g. by writing the result of the ONU's authentication challenge into the ONU authentication result table attribute, then the ONU may transition to an authentication success state (S3) or an authentication failure state (S4), depending on whether or not the OLT was authenticated successfully by the ONU. If the result is substantially the same as an OLT authentication value, then the OLT may have been authenticated successfully by the ONU and the ONU may transition to the state S3. If the result is not the same as the OLT authentication value, then the OLT may not have been authenticated successfully and the ONU may transition to the state S4. While the ONU is in the state S2, the OLT may not write a new value into the OLT random challenge table attribute.

Before entering the state S3 at block 440, the ONU may set a valid value for the master session key name attribute. In the state S3, the OLT may read the master session key name attribute upon receiving an AVC message from the ONU that indicates to the OLT that the ONU authentication status attribute value has been changed to state S3 value, e.g. using a value of about three. Waiting for the AVC notification before reading the master session key name attribute may allow the OLT to guarantee that the ONU is synchronized and the new key is ready to be utilized within the Transmission Container (TC) layer PLOAM function.

The authentication failure state S4 at block 450 may be indicated by the ONU authentication state attribute using a value of about four. During the state S4, the ONU and/or the OLT may abandon the present authentication attempt. The authentication failure state S4 may signify that the authentication procedure has failed for some reason, e.g. because of a PSK mismatch. The ONU may transition from the state S4 to the state S0 after a predetermined period of time (T2) has elapsed, e.g. after about one second.

The state S5 may be indicated by the ONU authentication state attribute using a value of about five. During the state S5 (Block 460), the ONU and/or the OLT may abandon the present authentication attempt. The state S5 may signify that the authentication procedure was started but could not be completed, e.g. due to a communication error, such as a loss of connection. The ONU may transition from the state S5 to the state S0 after a predetermined period of time (T3) has elapsed, e.g. after about one second.

In an embodiment, the OLT may be configured to synchronize with a TC layer, e.g. at the PLOAM, and achieve other security considerations, e.g. as in G.984 systems. When the ONU is in an authenticated state, the ONU may use its master session key to encrypt the key transmitted in an encryption_key PLOAM message. The master session key may be defined as:

MasterSessionKey=SelectedHashFunction (PSK, (OLT random_challenge|ONU random challenge)), where SelectedHashFunction ( ) is the hash function selected by the ONU in the ONU selected crypto capabilities attribute from a list supplied by the OLT.

In some cases, the encryption of the encryption key may be implemented using an AES-128 key in ECB mode. Since the encryption key carried in the encryption key PLOAM message may not be protected against forgery, there may be a possibility that the key may be forged or replayed by an attacker. Both forged and replayed keys may be detected using key synchronization mechanisms. However, a replay attack may force the OLT to use an old encryption key, which may violate the security requirements of downstream data encryption. Consequently, an OLT designed to resist a replay attack may ensure that the ONU does not send a previously used encryption key between authentication cycles.

Figure 5:
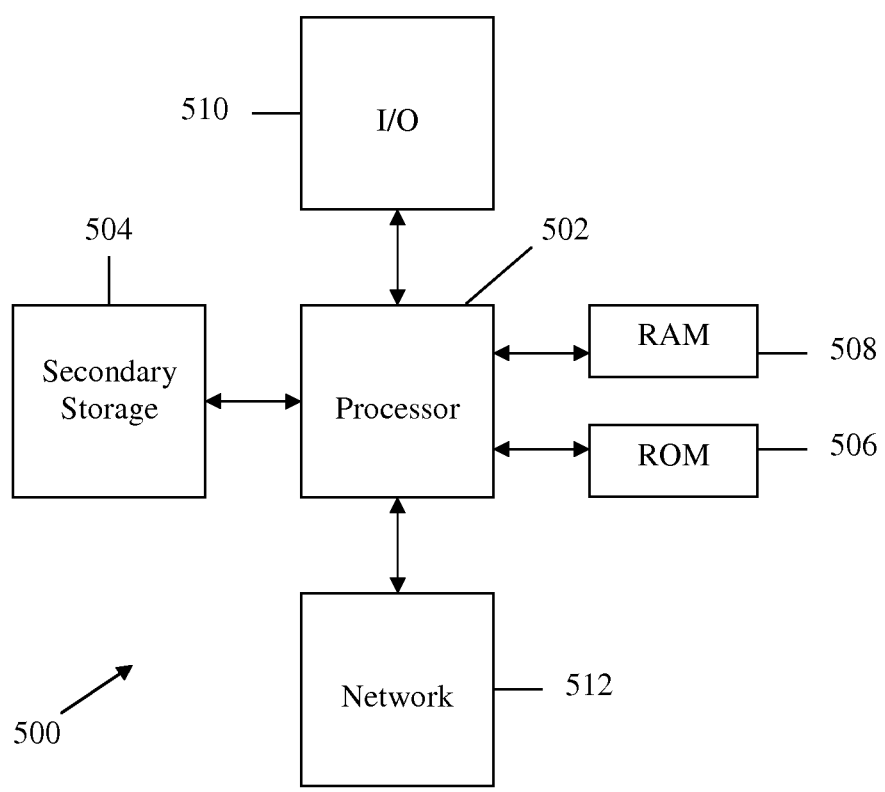
FIG. 5 illustrates a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network apparatus comprising:
   at least one processor coupled to a memory and configured to:
   exchange security information using a plurality of attributes in a management entity (ME) in an optical network unit (ONU) via an ONU management and control interface (OMCI) channel,
   wherein the ME is an abstract representation of resources and services in the ONU,
   wherein the attributes provide security features for the ONU and an optical line terminal (OLT),
   wherein the security features comprise a security capability discovery function, an ONU authentication function, an OLT authentication function, and a key privacy function,
   wherein the ONU authentication function allows the OLT to send a nonce to the ME and obtain a hashed combination of the nonce and a mutual shared secret between the ONU and the OLT from the ME, and
   wherein the OLT compares the hashed combination with a computed value to authenticate the ONU.

2. The apparatus of claim 1, wherein the security capability discovery function indicates to the OLT an existence of a security function and a plurality of algorithms supported by the ONU, and wherein the security capability discovery function allows the OLT to select which of the security algorithms to activate.

3. The apparatus of claim 1, wherein the OLT authentication function allows the OLT to obtain the nonce from the ME and to send the hashed combination of the nonce and a mutual shared secret between the ONU and the OLT to the ME, and wherein the ONU compares the hashed combination with the computed value to authenticate the OLT.

4. The apparatus of claim 1, wherein the key privacy function allows the OLT to send a public key to the ME, wherein the ONU encrypts an Advanced Encryption Standard (AES) key with the public key to obtain a private key and then sends the private key to the OLT via a physical layer operation, administration, and management (PLOAM) channel, and wherein the OLT decrypts the AES key from the private key.

5. An apparatus comprising:
   an optical network unit (ONU) configured to couple to an optical line terminal (OLT) and comprising an ONU management and control interface (OMCI) enhanced security control management entity (ME),
   wherein the ME is an abstract representation of resources and services in the ONU,
   wherein the ME comprises a plurality of attributes that support a plurality of security features for transmissions between the ONU and the OLT,
   wherein the attributes are communicated via an OMCI channel between the ONU and the OLT and provide the security features for the ONU and the OLT, and
   wherein the attributes comprise an ME identifier (ID) attribute of two bytes that identifies an instance of the ME.

6. The apparatus of claim 5, wherein the ME ID attribute has a value of zero, indicating only one instance of the ME.

7. An apparatus comprising:
   an optical network unit (ONU) configured to couple to an optical line terminal (OLT) and comprising an ONU management control interface (OMCI) management entity (ME),
   wherein the OMCI ME comprises a plurality of attributes that support a plurality of security features for transmissions between the ONU and the OLT,
   wherein the attributes are communicated via an OMCI channel between the ONU and the OLT and provide the security features for the ONU and the OLT, and
   wherein the attributes comprise:
      an OLT authentication result table attribute that specifies a result of authentication computation by the OLT based on a hash function and comprises an entry of 17 bytes; and
      an OLT result status attribute that is a Boolean attribute of one byte that reports a status of the OLT authentication result table attribute.

8. An apparatus comprising:
   an optical network unit (ONU) configured to couple to an optical line terminal (OLT) and comprising an ONU management control interface (OMCI) management entity (ME),
   wherein the OMCI ME comprises a plurality of attributes that support a plurality of security features for transmissions between the ONU and the OLT,
   wherein the attributes are communicated via an OMCI channel between the ONU and the OLT and provide the security features for the ONU and the OLT, and
   wherein the attributes comprise a master session key name attribute that is set by the ONU and comprises a name of a session key that is defined by a selected hash function and comprises 16 bytes.

9. An apparatus comprising:
   an optical network unit (ONU) configured to couple to an optical line terminal (OLT) and comprising an ONU management control interface (OMCI) management entity (ME),
   wherein the OMCI ME comprises a plurality of attributes that support a plurality of security features for transmissions between the ONU and the OLT,
   wherein the attributes are communicated via an OMCI channel between the ONU and the OLT and provide the security features for the ONU and the OLT, and
   wherein the attributes comprise an effective key length attribute of two bytes that specifies a maximum effective length, in bits, of keys generated by the ONU.

10. An apparatus comprising:
    a memory; and
    a processor coupled to the memory and configured to implement an enhanced security control optical network unit management and control interface (OMCI) managed entity (ME) comprising a plurality of attributes, wherein the attributes comprise:
       an ME identifier (ID) attribute;
       an optical line terminal (OLT) crypto capabilities attribute;
       an OLT random challenge table attribute;
       an OLT challenge status attribute;
       an OLT authentication result table attribute;
       an OLT result status attribute;
       a master session key name attribute;
       a broadcast key table attribute; and
       an effective key length attribute.

11. The apparatus of claim 10, wherein the attributes further comprise:
    an optical network unit (ONU) selected crypto capabilities attribute;
    an ONU random challenge table attribute;
    an ONU authentication result table attribute; and
    an ONU authentication status attribute.

12. An apparatus comprising:
a memory; and
a processor coupled to the memory and configured to implement an enhanced security control optical network unit management and control interface (OMCI) managed entity (ME) comprising a plurality of attributes, wherein the attributes comprise:
an ME identifier (ID) attribute;
an optical network unit (ONU) selected crypto capabilities attribute;
an ONU random challenge table attribute;
an ONU authentication result table attribute;
an ONU authentication status attribute
a master session key name attribute;
a broadcast key table attribute; and
an effective key length attribute.

13. An optical line terminal (OLT) comprising:
a processor configured to:
　generate a first message comprising an OLT crypto capabilities attribute value (AV) and an OLT random challenge table AV;
　generate a second message comprising an OLT challenge status AV;
　process a third message comprising an optical network unit (ONU) random challenge table attribute value change (AVC);
　process a fourth message comprising an ONU authentication result table AVC;
　generate a fifth message requesting an ONU selected crypto capabilities AV, an ONU random challenge table AV, and an ONU authentication result table AV;
　process a sixth message responding to the fifth message;
　generate a seventh message comprising an OLT authentication result table AV;
　generate an eighth message comprising an OLT result status AV;
　process a ninth message comprising an ONU authentication state AVC;
　generate a tenth message requesting a master session key name AV; and
　process an eleventh message comprising a response to the tenth message;
a transmitter coupled to the processor and configured to transmit the first message, the second message, the fifth message, the seventh message, the eighth message, and the tenth message; and
a receiver coupled to the processor and configured to receive the third message, the fourth message, the sixth message, the ninth message, and the eleventh message.

14. An optical network unit (ONU) comprising:
a processor configured to:
　process a first message comprising an optical line terminal (OLT) crypto capabilities attribute value (AV) and an OLT random challenge table AV;
　process a second message comprising an OLT challenge status AV;
　generate a third message comprising an ONU random challenge table attribute value change (AVC);
　generate a fourth message comprising an ONU authentication result table AVC;
　process a fifth message requesting an ONU selected crypto capabilities AV, an ONU random challenge table AV, and an ONU authentication result table AV;
　generate a sixth message responding to the fifth message;
　process a seventh message comprising an OLT authentication result table AV;
　process an eighth message comprising an OLT result status AV;
　generate a ninth message comprising an ONU authentication state AVC;
　process a tenth message requesting a master session key name AV; and
　generate an eleventh message comprising a response to the tenth message;
a transmitter coupled to the processor and configured to transmit the third message, the fourth message, the sixth message, the ninth message, and the eleventh message; and
a receiver coupled to the processor and configured to receive the first message, the second message, the fifth message, the seventh message, the eighth message, and the tenth message.

* * * * *

UNITED STATES PATENT AND TRADEMARK OFFICE
CERTIFICATE OF CORRECTION

PATENT NO.        : 9,032,209 B2                                   Page 1 of 1
APPLICATION NO.   : 14/063922
DATED             : May 12, 2015
INVENTOR(S)       : Frank Effenberger It is certified that error appears in the above-identified patent and that said Letters Patent is hereby corrected as shown below:

Title Page 3, (56) References Cited, Other Publications:

Delete ""Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," G. 984A Erratum, Telecommunication Standardization Sector of ITU, August 12, 2009, 2 pages." and insert -- "Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," G. 984.4 Erratum, Telecommunication Standardization Sector of ITU, August 12, 2009, 2 pages. --

Delete ""Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," G. 984A Corrigendum 1, Telecommunication Standardization Sector of ITU, March 2010, 8 pages." and insert -- "Series G: Transmission Systems and Media, Digital Systems and Networks, Digital Sections and Digital Line System-Optical Line Systems for Local and Access Networks, Gigabit-Capable Passive Optical Networks (G-PON): ONT Management and Control Interface Specification," G. 984.4 Corrigendum 1, Telecommunication Standardization Sector of ITU, March 2010, 8 pages. --

Signed and Sealed this
Twelfth Day of January, 2016

Michelle K. Lee
*Director of the United States Patent and Trademark Office*